2,802,777

PROCESS OF PURIFYING CRUDE 2-PYRROLIDONE

Lester J. Lohr, Woodstown, N. J., assignor to General Aniline & Film Corporation, New York, N. Y., a corporation of Delaware No Drawing. Application May 10, 1956, Serial No. 583,913

3 Claims. (Cl. 202—42)

The invention here presented is a new process for the purification of 2-pyrrolidone.

Pyrrolidone is commonly made by autoclaving butyrolactone with ammonia to yield a product which is mostly 2-pyrrolidone with residual small quantities of butyrolactone, ammonia and other by-products, such as various nitrogen containing breakdown products of the type of amides and the like, from which it is extremely desirable to obtain the 2-pyrrolidone for the formation of vinylpyrrolidone in as pure a form as possible, which in turn is used for the manufacture of a wide variety of polymeric substances, not the least important of which is polyvinylpyrrolidone which is particularly useful as a blood plasma extender and the like, and for which use it is imperative that the pyrrolidone used be of the highest purity. However the purification of pyrrolidone by previous methods has been extremely difficult and expensive. The only previous procedure was by a very careful fractional distillation, which, unfortunately, is difficult because of the closeness of the boiling points of pyrrolidone and butyrolactone which lie respectively at 245° C. and 204° C. In the past this purification has been accomplished by the use of a very efficient fractionating column which is expensive and costly to run.

According to the present invention it is now found that the pyrrolidone forms a hydrate, which at relatively low temperature will crystallize out from the solution. Accordingly the crude pyrrolidone, containing residual butyrolactone and impurities such as gamma-hydroxybutyramide, together with a molecule of water for each molecule of pyrrolidone, plus a suitable amount of additional solvent water is cooled to a temperature close to 0° C. The pyrrolidone hydrate begins to crystallize out at a temperature in the general neighborhood of +10° C. and the crystallization is quite complete at 0°. Accordingly the solid hydrate crystals are readily separated from the liquid impurities by such processes as filtering, decanting, centrifuging, or the like. These crystals then melt as they are warmed but remain in the form of the pure hydrate.

However, if for the subsequent reactions it is desirable that they be anhydrous then they can be subjected to azeotropic distillation with a suitable solvent such as benzene or other appropriate azeotrope. A desirable azeotrope is benzene. However toluene and naphthalene are also usuable although less satisfactory because of the higher boiling points. Similarly petroleum naphtha of an appropriate grade is quite satisfactory, it being desirable that a narrow cut naphtha be used, having a boiling point ranging closely similar to the boiling point of benzene. Alternatively pentane is usable, also hexane and heptane. The only requirement upon the azeotropic substance is, first, that it form an azeotropic mixture with the water; second, that the boiling point be reasonably near to the boiling point of water; third, that the material be non-reactive with the pyrrolidone; and fourth, that impurities are not carried into the pyrrolidone. The 2-pyrrolidone solution, with the axeotrope, may then be distilled, under vacuum, if desired, to provide the pure 2-pyrrolidone.

The following examples are offered as showing the best known ways of practising the invention and are not intended to limit the scope of the claims in any way.

Example 1

The appropriate amount of butyrolactone and ammonia are autoclaved at an appropriate temperature to produce the desired 2-pyrrolidone, which however is accompanied by unavoidable impurities. The crude reaction product from the autoclave, containing 1.00–1.25 moles of water per mole of 2-pyrrolidone, is crystallized at 0° and the mother liquor removed from the 2-pyrrolidone monohydrate by cold filtration or centrifugation. The crystalline 2-pyrrolidone monohydrate is dehydrated by azeotropic distillation with benzene, excess solvent distilled off, and the 2-pyrrolidone recovered by distillation under vacuum. Summary of yield data based on the crude product is as follows:

Mother liquor_____ 20% (rich in recoverable 2-pyrrolidone).
Yield 2-pyrrolidone_____ 70% (95–96% pure).
High boiling_____ 8% (impurities).
Fiar _____ 2%.

Example 2

The procedure of Example 1 was conducted using toluene in place of the benzene of Example 1; otherwise the procedure was the same and similar results were obtained.

While there are above disclosed but a limited number of embodiments of the process of the invention it is possible to provide still other embodiments without departing from the inventive concept herein disclosed, and it is therefore desired that only such limitation be imposed upon the appended claims as are stated therein or required by the prior art.

The invention claimed is:

1. The process for purifying 2-pyrrolidone comprising the steps of forming a pyrrolidone hydrate with water, cooling the hydrate and impurities to approximately 0° C. to crystallize the pyrrolidone hydrate, separating the crystalline pyrrolidone hydrate from residual impurities, distilling the pure hydrate with a substance which forms an azeotropic mixture with water, which has a boiling point reasonably near that of water, is non-reactive with the pyrrolidone and has no non-volatile impurities to remove the hydrate water and flash distilling the purified pyrrolidone under vacuum.

2. The process for purifying 2-pyrrolidone comprising the steps of forming a pyrrolidone hydrate with water, cooling the hydrate and impurities to approximately 0° C. to crystallize the pyrrolidone hydrate, separating the crystalline pyrrolidone hydrate from residual impurities, distilling the pure hydrate with benzene to remove the hydrate water and flash distilling the purified pyrrolidone under vacuum.

3. The process for purifying 2-pyrrolidone comprising the steps of forming a pyrrolidone hydrate with water, cooling the hydrate and impurities to approximately 0° C. to crystallize the pyrrolidone hydrate, separating the crystalline pyrrolidone hydrate from residual impurities, distilling the pure hydrate with toluene to remove the hydrate water and flash distilling the purified pyrrolidone under vacuum.

No references cited.